(12) United States Patent
Bisdikian et al.

(10) Patent No.: US 7,779,415 B2
(45) Date of Patent: Aug. 17, 2010

(54) ADAPTIVE LOAD DISTRIBUTION IN MANAGING DYNAMIC AND TRANSIENT DATA FOR DISTRIBUTED APPLICATIONS

(75) Inventors: Chatschik Bisdikian, Chappaqua, NY (US); Paul C. Castro, White Plains, NY (US); Archan Misra, Irvington, NY (US); Jinwon Lee, Gongju (KR)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 10/718,401

(22) Filed: Nov. 21, 2003

(65) Prior Publication Data

US 2005/0114862 A1   May 26, 2005

(51) Int. Cl.
*G06F 9/46* (2006.01)
(52) U.S. Cl. ..................................... 718/105
(58) Field of Classification Search .................. 718/105
See application file for complete search history.

(56) References Cited

U.S. PATENT DOCUMENTS 6,125,420 A * 9/2000 Eidson ........................ 710/242
7,024,563 B2 * 4/2006 Shimosato et al. .......... 713/186
2002/0194173 A1 * 12/2002 Bjornson et al. ................ 707/4
2003/0086426 A1 * 5/2003 Vandeweerd et al. ........ 370/394

* cited by examiner

*Primary Examiner*—Meng-Ai An
*Assistant Examiner*—Mengyao Zhe
(74) *Attorney, Agent, or Firm*—Ido Tuchman; Anne V. Dougherty

(57) ABSTRACT

A method, system, and computer program for dynamically adjusting the workload of an active resource associated with at least one parent workload group. The parent workload group includes a collection of workload units, with each associated to a key identifier such that workload units belonging to the parent workload group share an identical sequence of values at a specified depth value of the key identifier. The active resource independently determines whether an overload condition exists. If an overload condition exists, the depth value of the parent workload group is increased. The active resource may also consolidate a workload group if an under-load condition exists. Dynamically adjusting the workload of an active resource can be used as part of a method or system to dynamically adjust the workload of a distributed computing application across a dynamically varying set of active resources, and subsequently redirecting entities to the dynamically changing target resource.

35 Claims, 9 Drawing Sheets

ADAPTIVE LOAD DISTRIBUTION IN MANAGING DYNAMIC AND TRANSIENT DATA FOR DISTRIBUTED APPLICATIONS

FIELD OF THE INVENTION

The present invention relates to distributed computing and utility-oriented computing, where a group of computing devices cooperate to provide a specific service or function. The present invention is more particularly directed towards a distributed server-based application model where individual application client devices connect to and exchange data with one or more members of a dynamically varying set of server applications over a conventional communications infrastructure.

BACKGROUND

Distributed computing refers to a computer configuration where a group of computing devices, often called servers, collectively provide one or more computing-related services. With the increasing popularity of the Internet, distributing the computation and processing involved in any specific application has become a very commonplace practice, since it allows computational burden to be shared across multiple servers and helps reduce catastrophic single-point failures. Accordingly, many indispensable Internet-based services, such as the Domain Name Service (DNS) used to resolve machine host names to IP addresses or the popular Google search engine, are implemented as distributed services, with multiple computers collaboratively supporting a large set of users (commonly called clients).

Any distributed system must provide a mechanism of load distribution, since the servers must use some protocol to negotiate or decide the way in which the total workload is allocated among the constituent servers. The total workload itself can be considered to be defined by an abstract workload space. Among other things, this space can consist of application-specific objects (such as files or other data elements). The overall workspace can be managed in a cooperative distributed environment in one of two distinct ways:

1. Partitioning: where each server is responsible for some portion of the overall workload space. In such a strategy, the overall workspace of the application (such as the files stored by a distributed file system) is partitioned among the different servers, with each individual component of the workspace element being allocated to a specific server. Clients interested in retrieving or modifying a particular component must then be routed to the server that is responsible for the corresponding portion of the workspace.

2. Replication/Cloning: where the entire workspace (the entire contents of the application) is copied to each of the constituent servers so that each server can essentially operate as a stand-alone application. In this approach, the contents of all the servers are identical: a copy of each individual component is present at each server. A client interested in retrieving or modifying a state element can thus interact with any individual server. Servers are responsible for keeping all other servers informed of any changes to the state of any component.

Many interesting and emerging distributed computing applications are characterized by rapidly varying or dynamically changing components. These components may include content stored on the servers or content generated by the clients. Such applications include, but are not limited to, multi-player online games, directory services for pervasive data sources and distributed storage of vehicular information (Telematics). For such applications, replication is generally not a feasible strategy, since the overhead of maintaining identical copies of rapidly changing components at multiple servers proves to be unacceptable. Accordingly, such distributed applications employ partitioning to spread out the processing load. Most of the current implementations of load-spreading however have two basic limitations:

1. The number of servers over which the application is distributed is decided a-priori. Normally, some off-line technique, such as predictions of the forecast client loads, is used to calculate the number of servers needed. Once a set of servers are dedicated to a particular application, they typically remain committed to that application, even though the load levels may unexpectedly increase or decrease from their predicted profile.

2. The partitioning of the responsibility among the set of constituent servers is also decided a-priori. From an abstract point of view, this partitioning is usually based on dividing up of some namespace. For example, a set of 26 servers can carve up responsibility for storing files by assigning each server responsibility for a unique letter of the alphabet (e.g., Server 1 manages all files having names beginning with "A", Server 2 all files having names beginning with "B", etc.), or different servers can be assigned to handle different Internet domains (e.g., Server 1 handles .com, while Server 2 handles .org, etc.).

One drawback of conventional distributed computing applications is that they typically lack on-demand allocation of resources. Often times, the running cost of an application is based on the quantity of computing resources (e.g., the number of servers) that it consumes. If this number is fixed and decided a-priori, then it is generally based on a peak load (worst case) estimate. Such peak-based provisioning is often unacceptable since the application incurs expense even when the loads are potentially much lower and can be serviced by a much smaller set of servers. By making the deployment of additional servers a function of the current load, the distributed application can considerably reduce its need for the average number of computing devices. An effective solution would increase the number of servers during spikes in the workload, and similarly reduce the number of participating servers when the workload intensity diminishes.

Another drawback of current distributed application schemes is the lack of adaptation in workload partitioning. To effectively utilize a given set of servers, the application must be capable of dynamically modifying the partitions (portions of the total workspace) assigned to individual servers. The basic idea of adaptive partitions is to allow a server facing unexpectedly high workloads (or some other problems) to seamlessly migrate some of its responsibility to one or more alternative servers, which currently may have spare capacity. With this form of adaptive partitioning, the distributed system can adjust the allocation of responsibility in response to changing skews in the actual workload. Under this approach, the capacity of the application can be defined by the cumulative capacity of all the servers, and not be bottlenecked by the capacity of an individual server, since the application could now dynamically relocate load from an overloaded server to an under-loaded one.

SUMMARY OF THE INVENTION

The present invention addresses the above-mentioned limitations of conventional distributed applications by supporting on-demand resource allocation and adaptive workload partitioning. One approach of the invention uses a compact form of representation, referred to as an identifier key, to represent the individual components of the application in a mathematically convenient manner. The total component space of the application is then defined by a collection of all identifier keys, which essentially defines an identifier key space. In doing so, load distribution is then equivalent to modifying the key partitioning of the identifier key space across a variable number of servers. The partitions of the workspace can be logically considered to represent some grouping or clusters of identifier keys (or application components). At any instant, each server currently participating in the application is responsible for one or more distinct (non-overlapping) clusters, such that each cluster represents a collection of identifier keys. In general, the larger the cluster, the greater is the set of keys that are grouped together, and managed by a single server. To achieve load distribution among a greater number of servers, a cluster is broken up into smaller sub-clusters, and one or more of these sub-clusters is reassigned to alternative servers. These alternative servers can be servers that are currently participating in the application, or new (additional) servers that are co-opted to handle the increased application workload. In essence, the identifier key space is re-partitioned, with some existing partition being split into two or more smaller partitions, and some of these partitions are allocated to an alternative server. This adaptive workload partitioning strategy is attractive since clustering and de-clustering actions can be taken independently by each constituent server and do not require any central coordination among the various servers. From the partitioning viewpoint, the approach performs local re-partitioning (each partition is split in an independent fashion), rather than global readjustment of all existing partitions.

One exemplary aspect of the present invention is a mechanism for dynamically changing the granularity at which application-specific objects are clustered into groups, and for using this dynamic granularity adjustment to adjust the workload partitioning among a variable number of server devices, in response to changing workload skews. Adjusting load group granularity allows an application to adjust the quantity of work that is allocated to any single server and provides an ability to distribute load more effectively across multiple servers. Any single cluster (or group of identifier keys) is always assigned to a single server. Accordingly, the group indicates the basic unit of load distribution among the set of distributed servers. By making the groups smaller or larger, the present invention allows for dynamic control on the quantity of workload allocated to an individual server.

Another exemplary aspect of the invention is a mechanism for on-demand allocation of computing resources (servers) to an application. This aspect of the invention not only allows for changes to the granularity of the clusters, but also creates new sub-clusters. By combining sub-cluster creation with a mechanism for mapping the new sub-clusters to new servers, load-based modification of the number of computing devices (servers) over which the entire key space is distributed can be achieved. In general, each cluster is mapped to a unique server. Accordingly, when a cluster is split into two or more smaller sub-clusters, and each of them is mapped to potentially new servers, the number of servers allocated to that application increases. Similarly, when two or more smaller clusters are aggregated into a larger cluster, the number of allocated servers effectively decreases, since a larger group of application components are now mapped to a single server, instead of being dispersed across multiple servers.

A further aspect of the invention relates to the formation of the identifier keys that are used in the formal specification of the load distribution algorithm. The components that define a) the state of the application, and b) the interaction of the clients with the servers, are expressed through arbitrary strings called identifier keys. The total collection of all possible keys is defined as the key space. The invention works by essentially assigning variable-sized partitions of this key space to different servers. The variable partitions are expressed as key groups; each key group is nothing but a collection of individual identifier keys that share some identical sub-pattern. A server that is currently managing a specific range of identifier keys is then responsible for storing all application components that correspond to any key value falling in that range. Similarly, a client wishing to interact with this distributed application essentially describes its interaction by a key value, and must complete this interaction with the server currently managing this key value.

Yet another exemplary aspect of the load distribution strategy is to map keys not directly to corresponding servers, but rather pass them through an additional indirection mechanism. In this approach, the cluster size (the size of the key group) is varied by defining a variable quantity called the depth associated with each cluster. The depth indirectly specifies the common portion of the string, which is identical for all keys belonging to that cluster. The indirect mapping approach then takes a key and a depth value and uses it to generate a new identifier (called a hash key) from this combination. This generation process possesses the property that two identifier keys that are identical in the common portion of the string generate the same hash key. The hash key also has a range, which is essentially partitioned among the universe of available servers using a technique that lies outside the scope of this invention. The hash key is then used as the basis for identifying the server associated with a particular key and a particular depth. As the depth is varied for the same key, the associated hash key changes, resulting in a change in the mapping to a specific server. By using this indirection process, workload can be distributed among a variable group of servers, even though the allocation of the hash key range among the universe of servers remains static at all times.

Another exemplary aspect of the invention relates to the mechanism by which client nodes wishing to perform a transaction for a specific key are able to identify the appropriate server they should interact with. Since the association of an identifier key with a specific server is load-dependent (and dynamic), the client must perform some kind of lookup to determine the identity of the appropriate server. Clients are not required to be aware of the dynamic management of keys by servers, nor are they required to perform a lookup by contacting any specific server or servers. Moreover, an implementation of the invention does not require individual servers to be aware of the global partitioning of the identifier key space among the constituent state of servers. Clients can perform this lookup by contacting any arbitrary server. The invention specifies a distributed lookup approach through which the client will get redirected to the correct server.

Yet another exemplary aspect of the invention relates to a mechanism by which server nodes are able to identify alternative servers to whom they should delegate the responsibility for managing some subgroup of the key group. The source server (the one performing the splitting of the larger group) can independently define the constitution of the smaller subgroups (of identifier keys), and then use a lookup mechanism similar to that used by clients to determine the target server (or servers) that should now assume responsibility for one or more of these subgroups. On determining the target server, the source server then sends messages to the target server, instructing it to start assuming responsibility for the specified subgroup. The invention allows for recursive application of this load-distribution strategy (the target server can become a source server for the subgroup and repeat the splitting strategy for even smaller subgroups). In a similar manner, subgroups can be recursively aggregated into larger groups, effectively clustering larger groups of identifier keys on a single server.

The invention may include, for example, a method for dynamically adjusting the workload of an active resource. The workload is expressed as a collection of units, where each unit includes its own key identifier. An active resource is associated with at least one parent workload group, and the parent workload group includes a collection of workload units such that workload units belonging to the parent workload group share an identical sequence of values at a specified depth value of their key identifiers. Moreover, the identical sequence of values defines a group key identifier associated with the parent workload group. The method includes a determining operation for independently determining by the active resource that an overload condition exists at the active resource. If an overload condition exists, an increasing operation increases the depth value of the parent workload group such that at least two child workload groups are identified, and an assigning operation assigns a target resource to manage at least one of the child workload groups.

A system for running a distributed computer application over a dynamically varying set of distributed resources in accordance with the present invention may also be embodied. The each server in the system is configured to independently evaluate its own workload condition and decide on the creation or consolidation of group key identifiers to reduce or increase its workload. Furthermore, the number of resources involved in the distributed computation vary dynamically in response to changes in an overall workload. System includes a set of active resources cooperatively managing an entire set of key identifiers constituting the overall workload, each individual resource managing a dynamically varying group of key identifiers. An overall set of resources, of which the active resources constitute a subset, are utilized as part of the distributed computer application as needed. The system also comprises a mapping service that takes a virtual key associated with at least one key identifier as input and configured to produce the identity of the target resource from the overall resource set as an output. In addition, a set of client entities utilizes the distributed application, wherein each client entity is associated with at least one key identifier and dynamically determines the load-dependent group of identifier keys that it currently belongs to.

Another exemplary system for dynamically adjusting the workload of an active resource contemplated by the invention includes a plurality of workload units. Each workload unit is associated with a key identifier. The system includes a parent workload group comprising a collection of workload units, wherein the workload units belonging to the parent workload group share an identical sequence of values at a specified depth value of the key identifier. In addition, an active resource manages the parent workload. The active resource are configured to increase the depth value of the parent workload group such that at least two child workload groups are identified and assign a target resource to manage at least one of the child workload groups if an overload condition exists at the active resource.

A further exemplary aspect of the invention is a computer program comprising computer readable program codes for dynamically adjusting the workload of an active resource. The active resource is associated with at least one parent workload group, and the parent workload group includes a collection of workload units. Each workload unit is associated with a key identifier such that workload units belonging to the parent workload group share an identical sequence of values at a specified depth value of the key identifier. The program is configured to determine that an overload condition exists at the active resource. If an overload condition exists, the program increases the depth value of the parent workload group such that at least two child workload groups are identified and assigns a target resource to manage at least one of the child workload groups.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
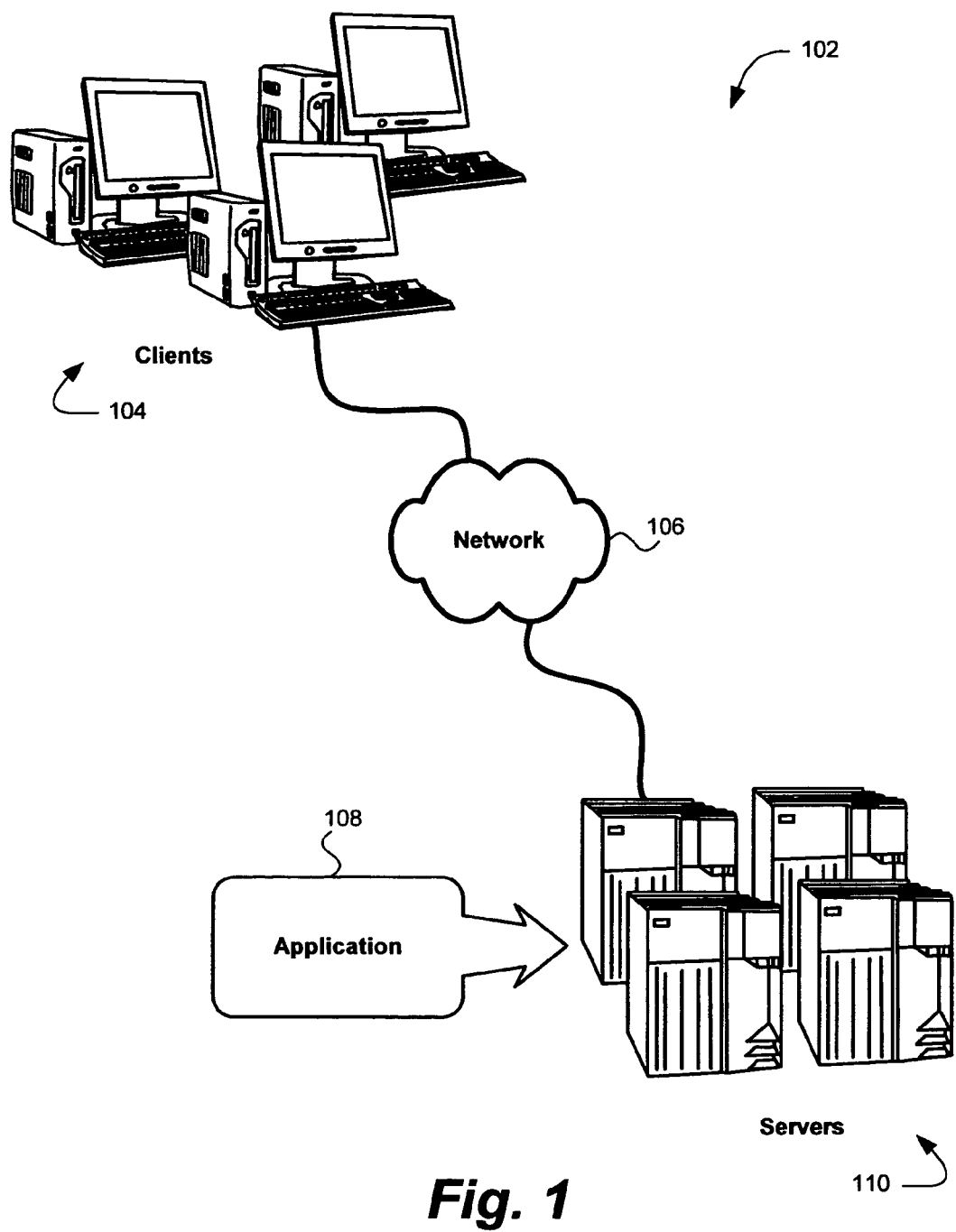
FIG. 1 shows an exemplary network environment embodying the present invention.

The following description details how the present invention is employed to adaptively allocate workload among a plurality of resources. Throughout the description of the invention reference is made to FIGS. 1-9. When referring to the figures, like structures and elements shown throughout are indicated with like reference numerals.

FIG. 1 shows an exemplary environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein.

The environment 102 includes clients 104 coupled to a network 106. The network 106 may be any network known in the art for effectuation communications between the various devices in the environment 102. Thus, the network 106 can be a local area network (LAN), a wide area network (WAN), or a combination thereof. It is contemplated that the network 106 may be configured as a public network, such as the Internet, and/or a private network, and may include various topologies and protocols known in the art.

In accordance with one embodiment of the present invention, the clients 104 utilize at least one application 108 (also referred to as a service herein), such as a multi-player online game, over the network 106. Furthermore, the application 108 is distributed among several servers 110 coupled to the network 106. Thus, the same application 108 is provided to the clients 104 by multiple servers 110. As discussed above, distributing the application 108 among servers 110 helps the computational workload from possibly millions of clients 104 to be shared such that no one server is overloaded and fails.

The present invention can be beneficially employed to dynamically adjust the number of servers 110 that a distributed application 108 uses, depending upon the variation in the application's load. The invention may further be employed to dynamically control the distribution of the total workload among the varying set of servers 110 over which the application 108 is distributed. As discussed in detail below, the present invention uses the notion of keys to capture the total workload of an application 108. Each individual key corresponds to some element of the application workload, such as a data item (e.g., a computer file) or a set of application client devices, so that the total workload of the application 108 consists of the aggregation of the workload of all possible keys. Keys are grouped into key groups (also called clusters) of potentially varying sizes. At any instant of time, a cluster is considered an atomic unit in the sense that all keys belonging to a particular cluster are handled by a common server. The distributed handling of the application load is thus equivalent to giving each server responsibility for one or more clusters.

When a particular server faces unacceptable load levels (or reaches some other condition indicating that it must reduce its load), it simply picks one of the clusters that it is currently managing and splits this cluster into two or more smaller clusters (called sub-clusters). Each sub-cluster consists of a subset of the keys of the original parent cluster. The server then identifies one or more additional servers to which it will shed some load, and uses signaling messages to transfer the responsibility of some or all of the sub-clusters to alternative servers. Thus, the overloaded server essentially splits its workload into smaller fractions, possibly keeps some portion of the original workload, and transfers the remaining portion to one or more servers.

It should be noted that two clusters of the same size (having the same number of keys) may not necessarily contribute identical amounts to the same workload, since the two clusters may have different quantities of underlying application elements. For example, consider an application scenario where each key corresponds to a unique application client device. The workload of any cluster may therefore be defined by the number of client devices associated with that cluster. Since client devices use the application in different ways and sporadically, not every key in a cluster will be active, i.e., have an active client associated with it. Accordingly, the workload of different clusters will be different. Therefore, a process of halving a cluster into two identically sized sub-clusters does not necessarily imply halving of the underlying workload; the workload can itself exhibit variable skew towards one of the two clusters. In general, it is this skewed workload and dynamic changes to the workload skew that make adaptive load distribution necessary. A server currently handling a reasonably inactive cluster may suddenly find that the cluster has become too active to be handled, necessitating the cluster to be broken up into smaller clusters across additional servers. As a result of this clustering process, the servers may end up being responsible for different-sized partitions of the overall workload. Of course, the process of creating smaller sub-clusters by splitting a larger cluster can be recursively applied such that the skews in the workload exhibited by larger-sized clusters get more uniformly distributed by using appropriately sized smaller clusters.

As described below, the present invention does not require any centralized coordination among the various servers. Load splitting decisions are made locally by an overloaded server using any technique known in the art to determine the identity of the target server or servers to which some responsibility is to be offloaded. This determination can be made centrally (e.g., using a table-based lookup), or as one embodiments shows, using a distributed lookup mechanism, such as a Distributed Hash Table (DHT) implementation. By removing the need for any centralized state maintenance, load distribution in accordance to the present invention proves to be highly scalable and can be used to support adaptive load distribution across any extremely large server set (e.g., one consisting of 10,000 or more servers).

The present invention also provides a mechanism for load consolidation. When the load on some parts of the distributed system is low enough such that it may be safely aggregated onto a single server (thereby freeing up one or more servers from the responsibility of managing smaller workloads), the sub-clusters may again be dynamically aggregated into larger clusters, thereby aggregating keys into larger groups. This process of aggregation is also localized since it involves interaction solely between the server that did the initial splitting (called the parent server) and the servers (called child servers) that are now returning responsibility for the subgroups back to the parent server. Both the splitting and consolidation processes can be applied recursively until the granularity of the groups (the size of the clusters) becomes appropriate to the current application workload. Moreover, the splitting of groups is only performed locally (i.e., by servers facing overload). Accordingly, the invention allows the formation of variable-sized key groups in different portions of the workload rather than mandating a uniform size of the key groups for the entire workload.

Due to the variable partitioning of key groups across a dynamically changing number of servers, the portion of the workload handled by a particular server changes in response to the workload. When the workload partition handled by a server changes, the application may also need to migrate additional application-specific state information or objects to or from the server. Such migration implies additional overheads on this partitioning or consolidation process. This overhead can be very high for conventional applications, such as databases or file systems, where different partitions are associated with large quantities of static data that must be migrated during re-partitioning. However, there are many more application scenarios (e.g., multiplayer video games, queries over streaming data) where the workload bottlenecks are determined largely by streaming or transient data that need not be stored. While a load partitioning scheme of the present invention applies to all distributed computing applications, it is especially well suited for such transient-data oriented applications where the re-partitioning does not involve the significant transfer of static data.

Figure 2:
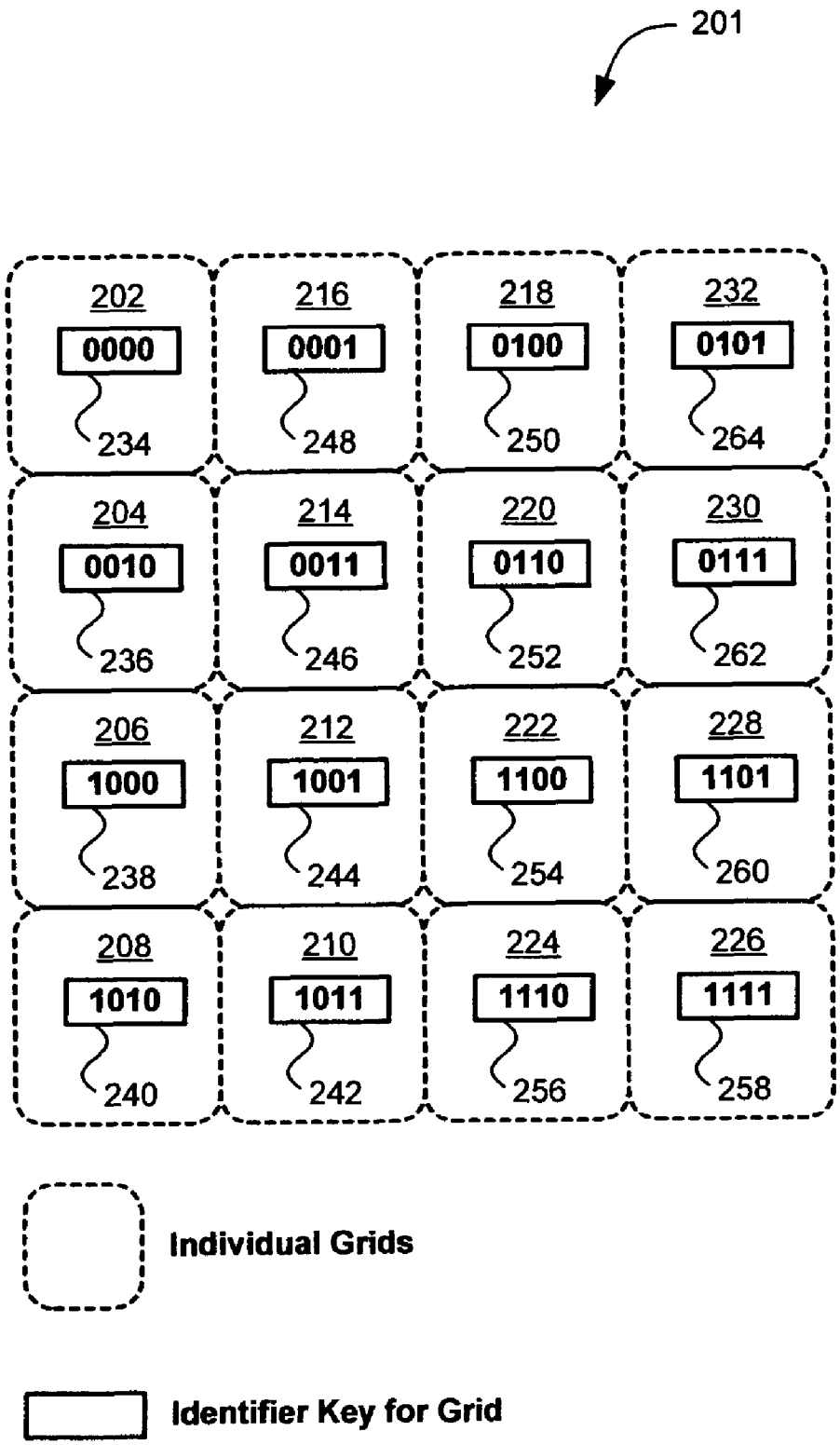
FIG. 2 shows a generic connection between keys and distributed systems, using the example of a location-based distributed system, where the key is used to encode a particular location in a hierarchical grid, and where workload is distributed among the constituent servers on the basis of the location regions that each server manages.

To further explain the present invention, it is necessary to describe the relationship between "identifier keys" and the overall workload of a distributed application. FIG. 2 shows an example of a hypothetical distributed application, where the workload is partitioned on the basis of a geographic region organized into grids. For example, the distributed application could track cars over a large area and respond to queries about the cars. Furthermore, different servers could be responsible for different partitions of an overall geographic region. In FIG. 2, the entire region 201 is divided into a set of grids (202 through 226), where each grid represents the finest unit into which the region 201 can be divided. In this example, each grid 202 to 226 is represented by a four-bit binary identifier key (234 through 258). In general, identifier keys 234 to 258 can be of arbitrary length and use other radices such as ternary or quaternary. Accordingly, grid 214 with an identifier key value "0011" (246) represents one of the finest elements of the partitioned region 201.

In one embodiment of the invention, assignment of identifier keys to grids is performed hierarchically and reflects some grouping among the regions themselves. For example, the entire top half of the region 201 has grids whose identifier keys begin with a "0", while the bottom half of the region 201 consists of grids having keys that begin with a "1". To mathematically denote this form of clustering, where the finest grids can be grouped into larger sized groups, groups are expressed with a prefix notation "*" meaning, "don't care". Accordingly, the top half of the region may be represented as "0*", a shorthand notation for specifying the collection of all grids whose keys begin with the initial pattern "0". Similarly, the representation "10*" represents the entire bottom left quadrant (comprising grids 206, 208, 210 and 212) since all the grids in the bottom left quadrant have identifier keys 238, 240, 242 and 244 that begin with the pattern "10". Note that the approach allows alternative forms of creating groups based on common attributes of constituent group members. For example, a group could be prefix based, with a group specification identifying the common trailing values that all constituent grids must have. As an illustration, the group "*10" refers to the collection of grids 204, 208, 220 and 224 since they have identifier keys 236, 240, 252 and 256 respectively, satisfying the specified key pattern.

Figure 3:
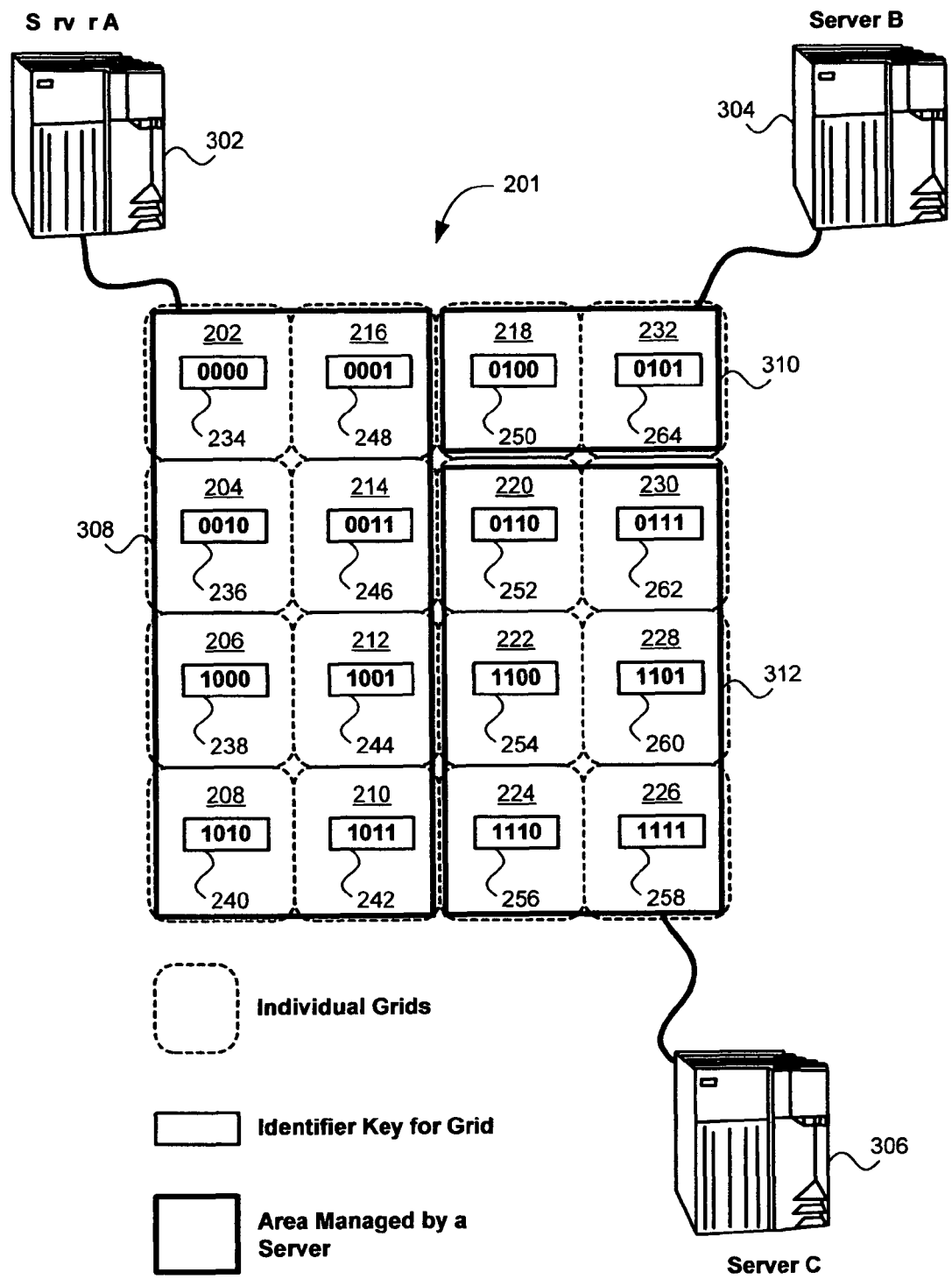
FIG. 3 shows a partitioning of workload among the constituent servers can be defined in terms of groups of keys that a particular server manages, and how the different workload partitions managed by different servers can be efficiently described in terms of key groups of varying sizes.

It can now be understood how the partitioning of the geographic area among the constituent servers can then be represented by specifying one or more identifier key groups that a particular server manages. FIG. 3 shows an example of workload partitioning. Once again, a region 201 represented by a matrix of grids (202 through 226), each of which is associated with its respective 4-bit identifier key (234 through 258). In addition, three servers, Server A 302, Server B 304, and Server C 306, manage variable-sized portions 308, 310 and 312 respectively of the overall region 201. The area of responsibility managed by server A (comprising grids 202 through 216) can be represented by the group "00*" (corresponding to keys "0000", "0001", "0010" and "0011") and "10*" (corresponding to keys "1000", "1001", "1010" and "1011"). Similarly, server B's area of responsibility (comprising the grids 218 and 232) can be represented by the group "010*" (corresponding to keys "0100" and "0101"). Finally, server C's area of responsibility can be represented by the groups "11*" (comprising grids 222, 224, 226, and 228) and "011*" (comprising grids 220, 230).

A server can perform load shedding in accordance with the present invention by simply modifying one or more groups that it currently manages. For example, suppose that Server A 302, which has so far managed the group "10*" (comprising the grids 206, 208, 210 and 212), consisting of the keys "1000", "1001", "1010" and "1011", stops managing this group and instead begins managing the group "101*" (comprising the grid 208 and 210), consisting of the keys "1010" and "1011". Thus, Server A 302 has reduced its workload; while it was earlier managing the entire lower left quadrant, it has now shrunk its region of responsibility only to the lower row of the lower left quadrant. To ensure that the entire workload is supported by all the servers, some other server (either currently idle, or engaged in managing some other portion of the workspace) should now assume responsibility for the residual group "100*" (comprising grids 206 and 212) consisting of the keys "1000" and "1001". This example shows how the problem of adjusting the workload partitioning can be achieved by equivalently modifying the management of various identifier key groups.

It is contemplated that the mapping of workload partitions to keys in accordance with the present invention can be applied to any distributed computing application. Workload partitioning of any distributed application is represented by an allocation of variable-sized key groups to individual servers. The identifier keys could represent an encoding of one or more application-specific attributes, on the basis of which the workload is partitioned. As an example, consider a vehicle tracking application, where the workload is distributed on the basis of the attributes of the vehicles. Suppose all vehicles have the attributes vehicle color, vehicle manufacturer, and the vehicle identification number (VIN), where each attribute can have 4 distinct values, and is represented as 2 bits each. Moreover, let the color attribute be coded as blue="00", red="01", white="10" and black="10". One possible hierarchical identifier key will require 6 bits, with the first 2 most significant bits recording the value for vehicle color, the next two vehicle manufacturer, and the final two used for VIN. In this encoding scheme, a server currently managing the key group "01*" is essentially responsible for tracking all red cars. On the other hand, a server managing the key group "1*" is currently responsible for tracking white and black cars. In such a system, the identifier keys and key groups have some semantic meaning associated with them.

It is further contemplated that identifier keys could represent an arbitrary mapping that has no relation to any semantically relevant attributes. As an example, a distributed file system application storing files may randomly assign a 6-bit binary number to each file. In this case, the key group "101*" simply represents a group of files whose file keys start with "101". Due to the random assignment, it may not be possible to associate any other semantic meaning to this group of files.

Thus, the present invention may apply to any form of encoding of application workload into identifier keys, whether they are semantically relevant or not. For the ease of explanation, the invention is described below with the notion of binary keys, where the smallest unit of application workload is represented as an N=7 bit key, where N denotes the total length of the individual identifier keys. In addition, the identifier keys define a process of workload adaptation, whereby an overloaded server sheds some of its workload by redirecting it to an alternative server. Similarly, a mechanism for coalescing key groups defines the reverse process of load consolidation, whereby an underutilized server may increase its workload by taking back workload from an alternative server.

As mentioned above, the present invention may distribute or consolidate workload by changing the key groups managed by a server in a hierarchical fashion. Each key group is associated with a parameter called the depth, which denotes the number of bits that help define the constituent identifier keys of the key group. All identifier keys in a key group are identical in the specified depth bits, but may have different values for the remaining bits. This depth is equal to the number of symbols before the "*" symbol. For example, the key group "101*" has a depth=3, since all the constituent keys of that group share an identical starting three bits "101".

Figure 4:
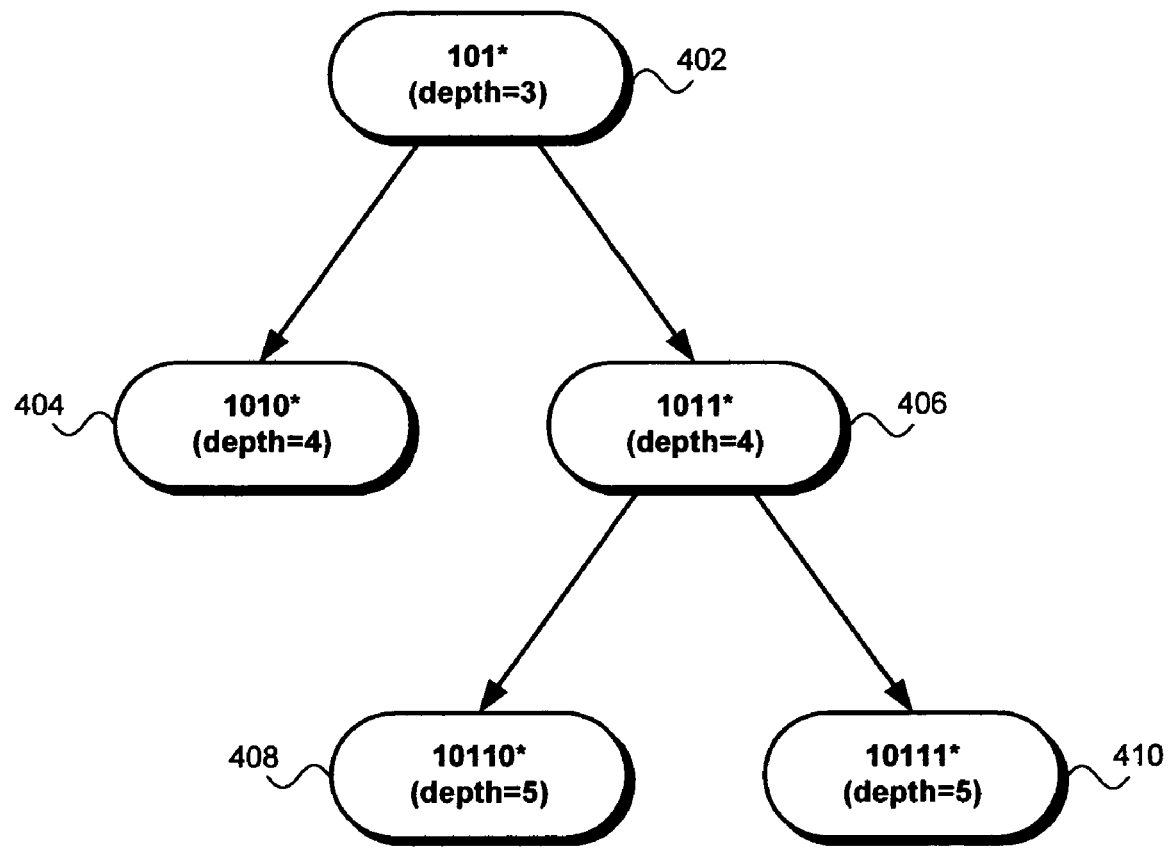
FIG. 4 shows how a larger cluster (a key group) can be successively broken down into smaller clusters (smaller key groups), and the logical representation of this splitting process through a binary tree.

FIG. 4 shows how increasing the depth for a key group is equivalent to splitting up the larger key group into two or more smaller groups. Consider for example the key group "101*" (402), which has a depth=3, and which must be split. To increase the depth of the key group 402, the key identifier "101*" is divided into the two key identifiers "1010*" and "1011*", which are obtained by considering all possible values in the next (4th) bit position. Thus, key group "101*" (402) is split into two subgroups: key group "1010*" (404) and key group "1011*" (406). It should be clear that the key group 402 was actually the combination of smaller subgroups "1010*" (404) and "1011*" (406). Furthermore, increasing the depth of a group (replacing it by two or more smaller subgroups) effectively disperses keys belonging to a common group across these smaller subgroups. Consider two 7-bit keys "1010110" and "1011110". While both are part of the key group "101*", they fall into two different key groups when the depth is increased to 4; "101011" is a member of key group "1010*", while "1011110" is a member of key group "1011*". It should therefore be observed that increasing the depth of a particular group and replacing the larger group by the resulting smaller groups is effectively a means to create smaller groups of keys.

In one embodiment of the invention, each key group is mapped to (or managed by) a single server. By creating two or more subgroups from a larger group, the original load of the larger key group can be distributed to two or more servers. Note that the reverse process is also true; decreasing the depth of two or more subgroups is equivalent to merging two smaller groups into a larger key group. For example, when the key groups "1010*" and "1011* are considered only at depth=3, they can be equivalently represented by a larger key group "101*" (with depth=3). This process of increasing the depth can be applied recursively on the individual subgroups as well. For example, in FIG. 4, the key group "1011*" (406) with depth=4 may again be split into two smaller groups, "10110*" (408) and "10111*" (410), both with depth=5. This process of depth increase can be generalized in two distinct ways:

1. For identifier keys described by higher order radices, increasing the depth by 1 serves to split a key group into a larger number of key groups. For example, a ternary key "0120*" with depth=4 can be split into three subgroups, "01200*", "01201*" and "01202*", all with depth=5.

2. Key depth can be increased by greater than 1. For example, the depth associated with the binary key "101*" (depth=3) may be increased directly by 2, creating four distinct subgroups "10100*", "10101*", "10110*" and "10111*", all with depth=5.

It is contemplated that both steps of using higher order radices and increasing the key depth by more than 1 can be applied together as well.

FIG. 4 also shows how, for binary key groups, depth increase can be considered to be represented by different depths on a binary tree structure. The key groups "1010*" and "1011*" (both with depth=4) are child nodes of the parent group "101*" (which has depth=3). These key groups can, in turn, have child nodes. For example, the key groups "10110*" and "10111*" (both with depth=5) are child nodes of the key group "1011*", while the key groups "011100*" and "011101*" (both with depth=6) are child nodes of the key group "01110*". The present invention allows different portions of the tree to grow to different depths. In other words, different portions of the overall application load can be clustered together at different levels of granularity depending upon the relative "hotness" of the associated key space.

Figure 5:
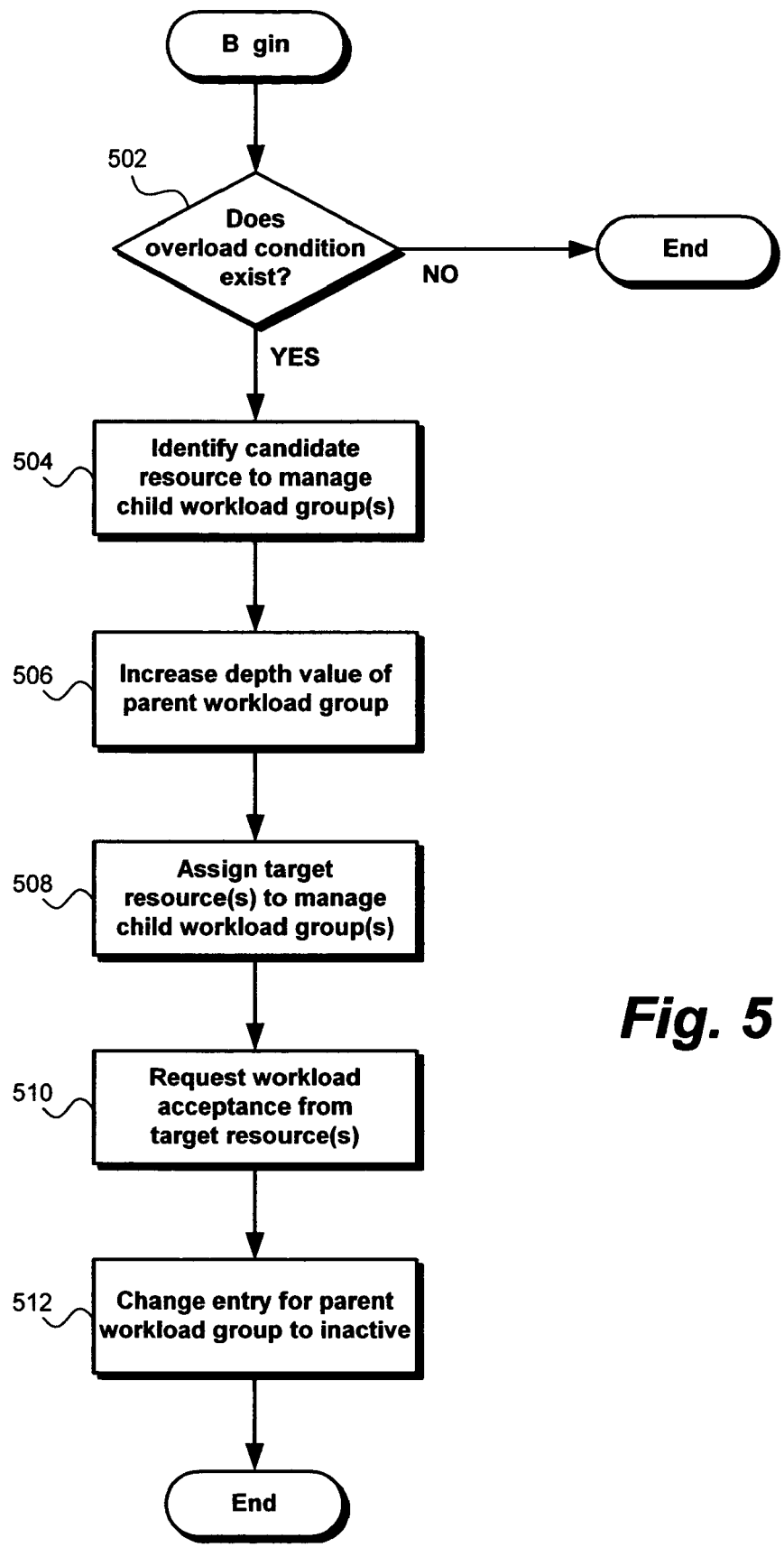
FIG. 5 shows an exemplary flowchart explaining the sequence of steps through which a candidate key group is split by a server into two or more key subgroups, one or more of which are then assigned to other servers.

In FIG. 5, a flowchart for an exemplary procedure to dynamically adjusting the workload of an active resource is demonstrated. This figure explains the steps by which an overloaded server sheds some load, effectively dispersing some subset of the workload to an alternate server. Note that the reverse process of load consolidation is deferred until later and is described with reference to FIG. 9. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Control flow begins at determining operation 502, where an active resource, such as a server, checks if an overload condition requiring load splitting exists. Generally, the active resource is associated with a parent workload group. The parent workload group includes a collection of workload units, and each workload unit is associated with a key identifier such that the workload units belonging to the parent workload group share an identical sequence of values at a specified depth value of the key identifier. If no overload condition exists, the procedure ends. On the other hand, if load splitting is determined to be necessary, control passes to identifying operation 504.

At identifying operation 504, the active resource chooses one or more candidate workload groups to be split. For example, at FIG. 3, Server A 302 manages a workload group 308 with key identifiers "00*" and "10*". If an overload condition exists, Server A 302 may choose to split the entire workload group 308, or just one of either the "00*" or "10*" workload group. It is contemplated that many algorithms can be used to determine which key group, or groups, are to be split. One such splitting algorithm is described in detail below. Returning to FIG. 5, once identifying operation 504 has completed, control passes to increasing operation 506.

At increasing operation 506, the active resource increases the depth value of the parent workload group such that at least two child workload groups are identified. Thus, a server managing a parent workload group having an identifier key "1010*" with a depth value equal to 4 may generate two child identifier keys "10100*" and "10101*" with depth values equal to 5 and identifying two child workload groups. As mentioned above, the depth value may be increased by other increments besides one. After increasing operation 506 has completed, control passes to assigning operation 508.

At assigning operation 508, a target resource is assigned to manage at least one of the newly created child workload groups. The process of identifying target resources to which subgroups will distributed is represented by a generic "Map ( )" function. It is contemplated that various algorithms used by the Map ( ) function. An exemplary Map ( ) function, based on DHTs and which does not require any centralized lookup table, is provided and discussed below.

In a particular embodiment the invention, once the Map ( ) function returns the identity of the target resource(s), the overloaded active resource (i.e., Server A 302 in FIG. 3) sends a "AcceptLoad" message at requesting operation 510 to the target resources (Server B 304 for "10100*" and Server C 306 for "10101*"), indicating that the target resources should now assume responsibility for managing the child groups. As part of this transfer of responsibility, the active resource may also need to transfer additional application-specific objects (i.e., corresponding to the subgroups "10100*" and "10101*") to the target resources.

After child workload group responsibility has been transferred to one or more target resources, the active resource deactivates its mapping entry for the parent workload group at changing operation 512. For example, Server A deactivates its entry for "1010*", indicating that it is no longer managing this larger workload group. The entry is maintained as an "inactive entry", implying that the server was managing this group, but has currently split this group into smaller groups. In other words, an inactive entry denotes that the corresponding node in the binary tree currently has child nodes (and possibly, other descendant nodes) with larger depth. As part of the mapping process, Server A is allowed to have one or more of the subgroups map back to itself.

In one embodiment of the present invention, the server splits an active key group into two (or more) key subgroups, but then retains responsibility for one (or more) of these subgroups. This form of a Map (.) function allows for true load-shedding, where an overloaded server essentially keeps some fraction of the original workload to itself, and only distributes the remaining fraction of the workload to alternative servers. In another embodiment, a server can create multiple subgroups by increasing the depth by a larger amount (e.g., increasing the depth by 3 creates 8 subgroups), and then selectively keeps a subset of these subgroups on itself while redirecting the management of the remaining subgroups to alternative servers.

As a result of the present invention, the mapping from a particular identifier key to the corresponding server is dynamic. Since the key is part of different active key groups (of differing depths) at different instants, and since these different active groups (which share a parent-child relationship in a binary tree) potentially map to different servers, a client needs dynamically determine the identity of the appropriate server node. For example, in FIG. 3, a vehicle currently located in grid 230 (with the key "0111") must perform transactions with Server C 306. However, at some future instant, Server C 306 may split the key group "011*" (depth=3), keep the child group "0110" and hand off responsibility for the other child group "0111" to Server B 304. The vehicle in grid 230 must then dynamically rebind itself, or be redirected to Server B 304.

In general, a particular key is a member of multiple key groups, which are arranged as parent-child nodes in a binary tree. For example, the key "1010111" is a member of key groups "*" (depth=0), "1*" (depth=1), "10*" (depth=2), "101*" (depth=3), "371010*" (depth=4), "10101*" (depth=5), "101011*" (depth=6) and "1010111*" (depth=7). Due to the load-splitting algorithm, only one of these key groups is active at any instant. The transaction for that particular key must be directed towards the node with the active entry.

The dynamic assignment of a key to its currently active key group can be represented by associating a depth with each individual key as well. This is similar to the concept of depth associated with key groups. If the key "1010111" is supposed to interact with the server having an active entry "101*", then the key "101011" may be considered to currently have a correct depth of 3, which implies that it is currently mapped to the group "101*" (formed by taking the first 3 bits of the key). On the other hand, if a client is supposed to interact with the server having an active entry "10101*", then the same key has a current depth of 5, and is mapped to the group "10101*" (formed by taking the first 5 bits). It is thus clear that the client's process of finding the right server is equivalent to determining the currently valid depth associated with a given key.

Figure 6:
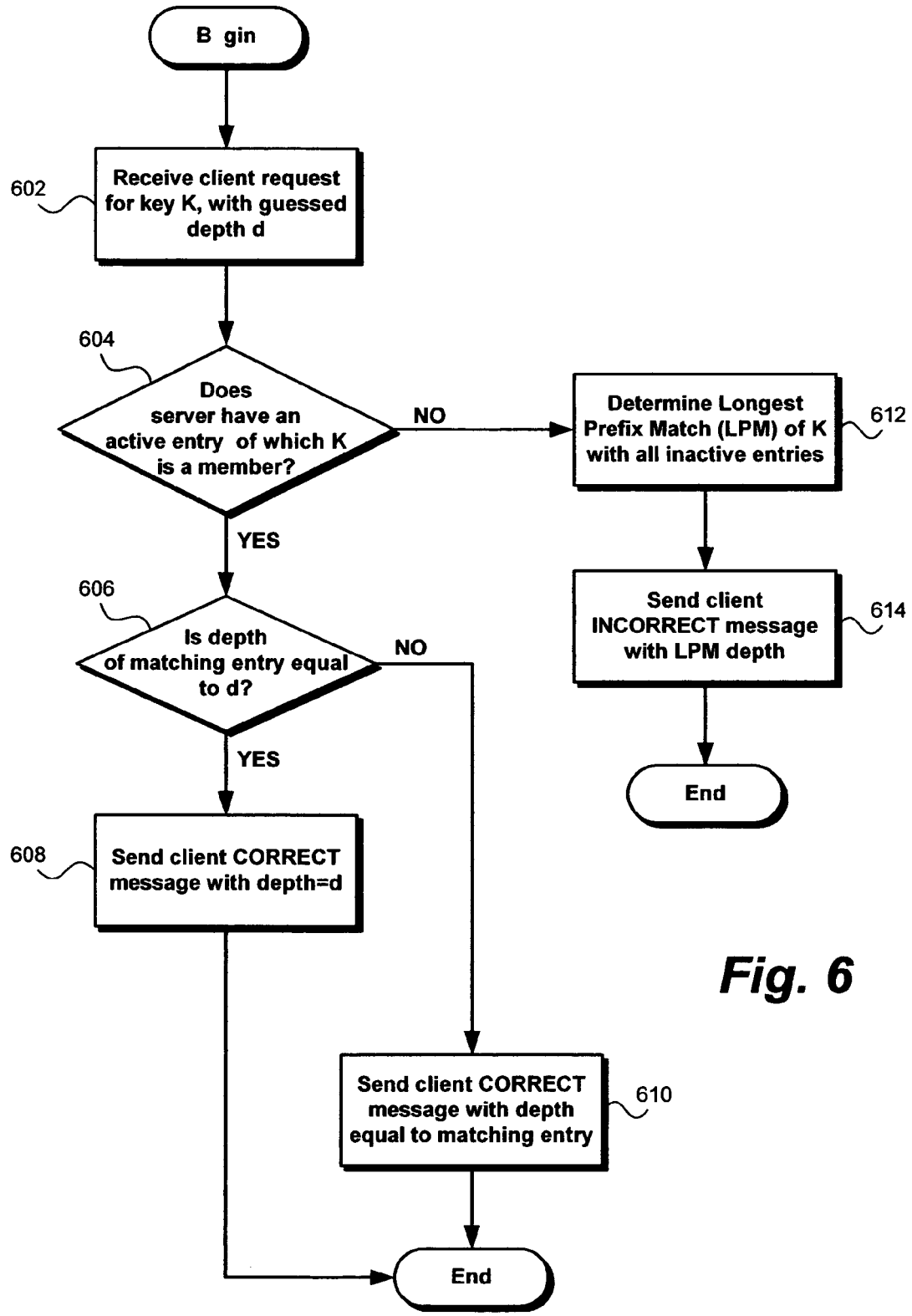
FIG. 6 shows an exemplary flowchart by which a server receiving a request specifying a particular key and depth combination determines if it should be processing this request. The flowchart also shows the logical steps needed to respond to the request in case the server determines that the key and depth combination is incorrect, or that the request should be handled by an alternative server.

The process by which a client (or generically, any requester trying to resolve a key to its appropriate server) dynamically finds the right server for a particular key is logically as follows: the requestor assumes (guesses) some depth for the key and issues a probe to the server associated with the corresponding key group to see if that key group is currently active. For example, Client C can guess a depth of 3 for the key "1010111" and issues a probe to Server A to determine if the Map ( ) function indicates that A should be responsible for the group "101*". FIG. 6 shows a flowchart for an exemplary procedure by which a server or other resource receiving a request specifying a particular key and depth combination determines if it should be processing the request. The figure also shows the logical steps performed to respond to the request in case the server determines that the key and depth combination is incorrect, or that another server should handle the request.

The process begins at receiving operation 602, where a resource, such as a server, receives a probe message from a requestor, such as a client, to determine if a particular identifier key and key depth is active. On receiving the probe message, the probed server can then respond with either a "CORRECT" or "INCORRECT" message, indicating whether the guess was correct or not. In the case of an "INCORRECT" message, the server returns additional information back to the requester.

Next, at determining operation 604, the server determines if the key is actually a member of any of its active key groups, i.e., if any of the possible prefixes of the key are currently listed as an active entry for the groups being managed by the server. If it is active, control passes to checking operation 606, where the server checks if the depth of the matching active key group agrees with the guessed depth "d" specified in the probe message by the requester. If the two depths match, the requester has indeed "guessed" the right depth and arrived at the correct server and control passes to sending operation 608. During this operation, the server returns a "CORRECT" message, echoing this correct depth=d.

In case the client's estimated depth is incorrect, the server can be faced with two different conditions. In one case, the client has still reached the right server, but with the wrong depth. As an example, suppose that the Map ( ) function has identified Server A as responsible for the subgroup "10101*" as well. Although the entry "101*" is not active (that group has been recursively split into smaller groups), Server A is still the right server for the key "1010110", albeit with a depth equal to 5. In this case, control passes to sending operation 610, where the server returns a "CORRECT" message to the requester, but specifies the corrected depth (the depth of the matching active key group). For the other case, when the client has reached the wrong server, the server returns an "INCORRECT" message, but with the "longest prefix matching" (LPM) depth, which is essentially an indication of the closest ancestral group of the key that the server is individually aware of.

At this point of the discussion, the Longest Prefix Match (LPM) process is explained. The server essentially considers all its inactive entries (groups that it actively managed at some previous time, but which have currently been split into smaller groups), and, at determining operation 612, determines the longest match (over all these entries) with the client's key, starting from the first bit. For example, if the server has inactive entries for "01*", "100110*" and "111*", the LPM match for the key "1010110" equals 2, since the key has a maximum match of two starting bits (with the entry "100110*"). Once the depth is determined, control passes to sending operation 614 and the server returns this depth (which could be 0 as well, if no bits match at all) in its "INCORRECT" message. Clearly, if groups are defined by alternative forms of hierarchical key groups (e.g., based on common suffixes instead of prefix), the process of identifying the nearest ancestral group may involve a slightly different matching criteria (e.g., longest suffix match).

To eventually determine the correct server, the client/requestor must also follow a process of using the "CORRECT" and "INCORRECT" responses from the server to eventually determine the right depth. In general, a variety of iterative schemes are possible. For example, a client can start from a value of depth=0 and proceed linearly to the maximum possible value of depth, contacting each possible server, until a match is found. All such depth determination procedures can be accommodated by the present invention.

Figure 7:
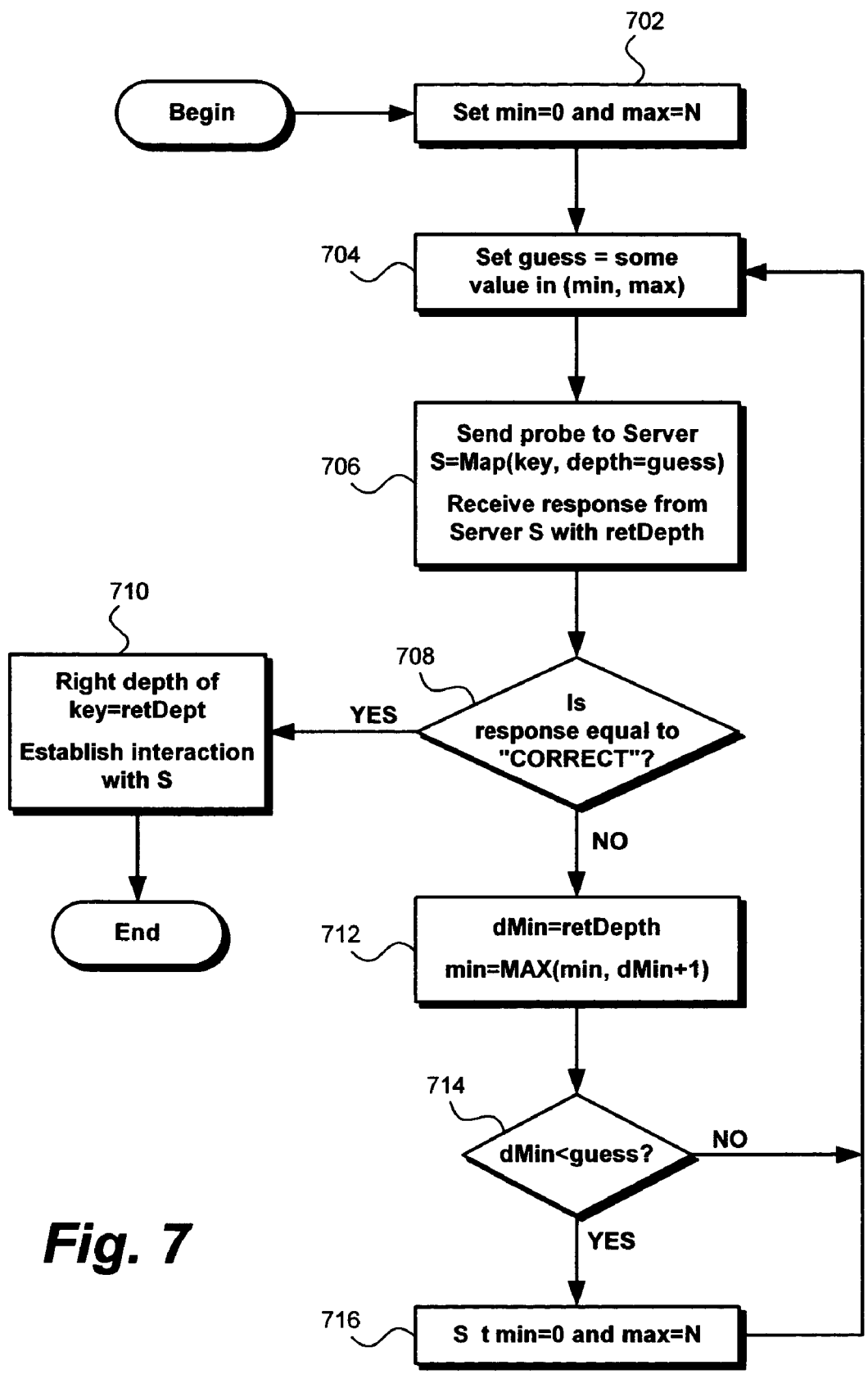
FIG. 7 provides an exemplary flowchart detailing the steps a client, seeking to determine the appropriate server for a particular key at any instant, takes to identify the appropriate server. The determination process essentially involves trying out the range of possible depths associated with this key, and iteratively checking if the corresponding key group is being actively managed at any server.

In FIG. 7, an exemplary depth-determination procedure contemplated by the present invention is shown. The procedure beings at initializing operation 702. During this operation, a minimum search range is set to zero and a maximum search range is set to N, where N is the length of the key. This is because the true depth for a key is known to lie between zero and the length of the key. Once the initialization operation 702 is completed, control passes to selecting operation 704.

At selecting operation 704, the server chooses a particular value between min and max. As one possible choice technique, the client can choose the midpoint between (min, max). After the selecting operation 704 has completed, control passes to sending operation 706.

At sending operation 706, and the client issues a probe message to the server indicated for the corresponding key group. In response to this probe message, the server will send a response (either CORRECT or INCORRECT) using the logic outlined above and shown in FIG. 6. The parameter returned by the server is referred to as the retDepth parameter. After the response is received by the client, control passes to checking operation 708.

At checking operation 708, the client checks if the server responded with a CORRECT message. If it did, the server response contains the true depth in the retDepth parameter. Accordingly, the client has determined the true depth associated with the key, and control passes to binding operation 710, where the client is bound to the correct server and the process ends.

If, however, the server returns an INCORRECT message, then control passes to setting operation 712, where the client sets the minimum interval of the search range to the greater of the current minimum or the retDepth value incremented by 1. This choice is motivated by the observation that an INCORRECT message specifying a retDepth implies that the true depth associated with the key must be at least retDepth+1. Once a new minimum interval value is assigned, control passes to checking operation 714.

At checking operation 714, the client then checks if the retDepth value is also smaller than the client's guessed depth (sent in the previous probe message). If so, control continues to setting operation 716, and the client also adjusts the maximum range of the search to the previous guess value. This part of the logic is motivated by the observation that if the client's true depth is indeed greater than the guess value, then the distributed system must have an inactive entry for the group with depth=guess, since the smaller subgroup (with greater depth) could have been formed only by splitting the larger group which would have become an inactive entry. Since the client's request was unable to find an inactive entry with depth=guess, this implies that the true depth must be smaller than guess. The client will then repeat the search algorithm over the modified range. This process continues until the client is able to obtain the correct server; the one that has an active entry that includes this key.

As mentioned above, the present invention works with any correctly designed Map (.) function, as long as the Map ( ) function is able to resolve key groups (active or inactive) to the appropriate server. This map function can either be centralized (every requestor must contact a specific computing node to determine the identity of the corresponding server in sending operation 706) or distributed (the mapping is stored in multiple nodes). One embodiment of this map function could be a static table, containing a one-to-one mapping from each unique key group to a particular server.

It is contemplated that the present invention may be implemented using Distributed Hash Tables (DHTs). DHT is essentially a distributed implementation of the mapping function. However, DHT implementations have been shown to posses other attractive functions in that they scale very well with an extremely large number of server nodes and are able to handle dynamic addition or removal of computing nodes from this distributed set in a very efficient manner. For purposes of discussing the present invention, it suffices to know the following abstract behavior that is common to all DHT implementations:

1. DHT essentially takes an input key (which may or may not be the same as the identifier key) and first uses a "hashing function" (a randomizing technique) to compute a new "hash value". This hash value itself may be represented as a binary number of M bits. The various DHT nodes use signaling techniques to carve up the entire range of all possible binary hash values (M bits imply a total of $2^M$ possible hash values). The hash value is then used to direct the input key to the server currently managing this hash value. Accordingly, to map a particular object to a specific server, the object's identifier key can be used as an input to the DHT framework. The mapping from the identifier key to a particular server is then represented as follows:

Identifier Key k -->(Hash Function)--> Hash value v
--> (DHT mapping)--> Server s, where the identifier key k is first transformed by the hashing function to a hash value, and the hash value is then mapped to a particular server. Identifier keys that map to an identical hash value are thus directed towards a common server. Similarly, keys that result in distinct hash values are, with high probability, directed to different servers.

In general, conventional DHT algorithms do not allow the same identifier key k to map to different hash values (v) at different instants. In one embodiment of the present invention, DHTs are utilized in a novel manner, by a) defining a technique to generate different hash values for the same identifier key, and b) using this differential hash value generation technique to provide adaptive load distribution in distributed environments.

Figure 8:
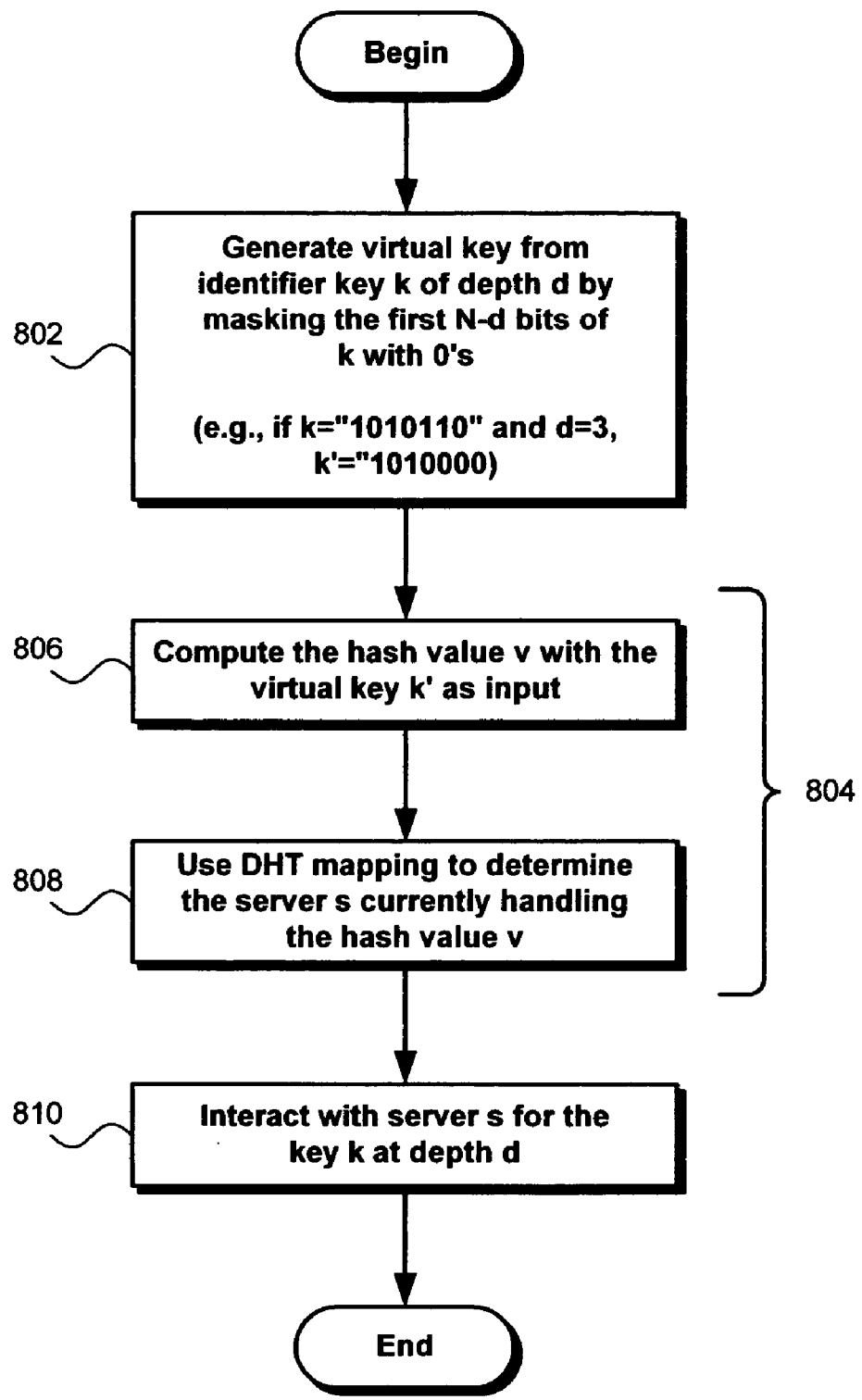
FIG. 8 shows how the adaptive load distribution technique can combine the key-based representation of workload with Distributed Hash Table (DHT) primitives for scalable and efficient load redirection. The figure explains how keys can be associated with a variable depth, and how the formation of virtual keys based on this depth, can be used to direct the same identifier key to different servers. The depth parameter then provides an extremely convenient way to implicitly alter the mapping from a key to a target server.

This embodiment uses a form of encoding to create "virtual keys" out of the identifier keys. The virtual key is then used as the input key to the hash function. In FIG. 8, an exemplary procedure for combining the key-based representation of workload with Distributed Hash Table (DHT) primitives for scalable and efficient load redirection is shown. To illustrate the procedure, a binary identifier key k="1010011" of a length N=7 and a depth value d=3 is mapped to an underlying server using a DHT implementation.

The procedure begins at generating operation 802, where a virtual key is generated. To generate the virtual key k', the server takes the first d bits of k and masks the least significant bits with N-d trailing zeroes. For example, the virtual key for an identifier key "1010011" at depth=3 is given by "1010000", and at depth=6 is given by "1010010".

Once the virtual key is generated, the DHT protocol comprising the steps collectively demarcated as 804, is then invoked on the virtual key k' to determine the target server s (the embodiment assumes that identifier key k at depth d is managed by this server s). The DHT protocol 804 works as a two-step process. First, at computing operation 806, the hash value v associated with this key k' is computed. Second, at mapping operation 808, the DHT's distributed lookup is used to identify the server s currently responsible for the hash value. Once server s is identified, the client can then communicate with the appropriate server at interacting operation 810.

A similar procedure may also used to identify the target server for a key group kg with a given depth dg. The most significant dg bits of the key group kg are preserved while the least significant N-dg bit are masked with trailing zeroes to form the virtual key. For example, the virtual key for the key group "010*" (dg=3) is "0100000", while that for the key group "1101*" (dg=4) is "1101000".

As discussed above, a client may use the depth and key combination to identify the target server for a probe message. When used in combination with DHTs, this process of depth determination by the client is further developed. The client creates the virtual key corresponding to the "guessed" depth and then uses DHT to identify the target server. Similarly, when a server tries to determine the identity of a server that should store a particular key group, it first forms the virtual key for this key group and uses this virtual key as an input to DHT to determine the target server. By employing this technique, a key group will have the same virtual key as any identifier key that belongs to that group as long as the depth of the identifier key is set to the depth of the key group. For example, consider the key group "1101*" (depth=4), to which both keys "1101010" and "1101111" belong. At depth=4, both these identifier keys generate the virtual key "1101000", which is identical to the virtual key generated from the group "1101*". Accordingly, if the process assigns a key group to a particular server, then all identifier keys for that group will also be directed to the same server, since the assignment of both the key groups and the individual identifier keys is done on the basis of a common virtual key.

There is an additional benefit of using virtual keys and DHT techniques to implement the adaptive load distribution technique. Consider a parent server that tries to split a key group "1010*" (depth=4) to two distinct servers. The server first creates two child groups "10100*" and "10101*" and tries to identify servers for these two subgroups. However, the process of constructing the virtual key ensures that one of these subgroups (the one formed by masking a "0") has the same virtual key as the parent group. For example, both "1010*" (depth=4) and "10100*" (depth=4) have the same virtual key "1010000". Accordingly, the parent server will always identify itself as the target of one of these subgroups. Accordingly, the virtual key mechanism allows a parent server to perform true load-shedding since it always keeps one half of the original key space and reassigns the other half of the original key space to some other server.

As stated earlier, the present invention allows for the use of a variety of different algorithms while choosing a candidate key group for splitting. In one embodiment, the server keeps track of the workload associated with each individual key group that is managing. This may be done by using counters or monitors to separately track the application activity in each of these key groups. If the server needs to shed some load, it will then select the key group contributing the maximum load (the "hottest" key group). Other possible selection mechanisms could include choosing the largest active key group (the one with the smallest depth), the smallest active key group (the one with the largest depth) or the key group with the largest "normalized" workload (i.e., the workload divided by the size of the key group).

It is contemplated that servers can use the notion of virtual keys and depth to not only shed load and distribute it to additional servers, but also to consolidate load from a larger number of servers to a smaller server set. One way to achieve this consolidation is to periodically communicate the workload of each active key group to its parent group. As explained in FIG. 4, the load-splitting operation can be modeled as a binary tree, where active key groups appear as leaves of the tree. Each of the key groups in that tree is associated with a server. A server managing a leaf key group can periodically report the observed workload back to the parent server i.e., the server that was managing the parent key group before it got split. For example, in FIG. 3, there are three leaf key groups: "1010*" (depth=4), "10110*" (depth=5) and "10111*" (depth=5). The server managing a leaf key group (e.g., "10111*") will periodically report the workload for this group back to the server that was managing the parent key group ("1011*").

Figure 9:
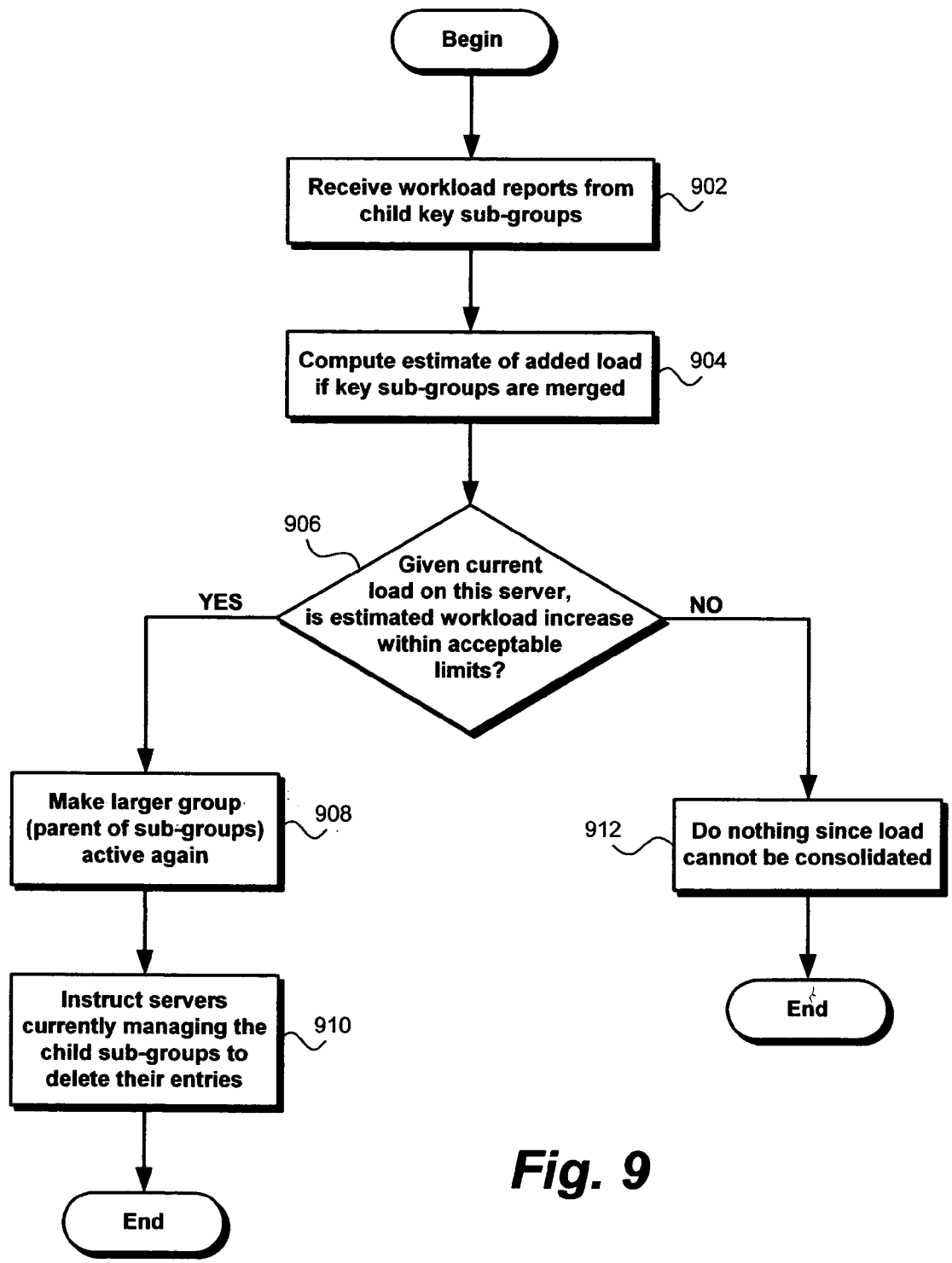
FIG. 9 shows an embodiment of how the distributed set of servers can exchange local signaling messages to determine when the workload has sufficiently decreased to merge subgroups into a larger group. These steps consist of exchanging load information from a child server (one managing an active key group) to a parent server (the one that split the larger group to create these smaller clusters), and then having the parent server instruct the appropriate child servers to return responsibility for the smaller subgroups back to the parent server.

Turing to FIG. 9, an exemplary procedure for consolidating workload in accordance with the present invention is shown. The procedure begins at receiving operation 902. During this step, the parent server receives workload reports from the servers managing the child key groups. After receiving the workload repots, control passes to estimating operation 904.

At estimating operation 904, the parent server estimates the additional workload it would assume if the parent server took responsibility for one or more of the child key groups. For example, the server responsible for the (currently inactive) group "1011*" can use load reports for the key groups "10110*" and "10111*" to estimate the total workload increase if it decreased the depths back for these groups to 4. After estimating operation 904 is completed, control passes to decision operation 906.

If, at decision operation 906, the workloads of the subgroups and the parent server were both low enough, according to some pre-configured policy, the parent server could then resume responsibility for the larger group (e.g., "1011*"). Thus, control passes to activating operation 908 wherein the entry is made active. Next, at instructing operation 910, the child servers are instructed to remove the entries for the subgroups. Once the instructing operation 910 is performed, the process is completed. If, however, the load levels are too high for consolidation, control passes to operation 912 where the server leaves the current distribution strategy unchanged. Alternative embodiments of this load consolidation process could involve the use of a centralized entity to determine when load consolidation could occur, or the use of signaling between multiple nodes to simultaneously collapse multiple levels of subgroups.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for dynamically adjusting a workload of an active server, the method comprising:
   dividing the workload into a collection of workload units, each workload unit including its own key identifier identifying the workload unit;
   associating the active server with at least one parent workload group, the parent workload group including the collection of workload units such that the collection of workload units belonging to the parent workload group share an identical sequence of values at a specified depth value of their key identifiers, the identical sequence of values defining a group key identifier associated with the parent workload group;
   independently determining by the active server that an overload condition exists at the active server; and
   if the overload condition exists:
   increasing the depth value of the key identifier associated with the parent workload group such that at least two child workload groups are identified;
   assigning a target server to manage at least one of the child workload groups;
   receiving a virtual key associated with at least one of a dynamically varying group of identifier keys as input to produce an identity of a target resource from an overall resource set as an output; and
   associating each one of a set of client entities with at least one identifier key, wherein each client entity dynamically determining the dynamically varying group of key identifiers that it currently belongs to.

2. The method of claim 1, further comprising if the overload condition exists, identifying at least one candidate server to which the child workload groups may be distributed using a decentralized protocol, the at least one candidate server including the target server.

3. The method of claim 1, further comprising requesting workload acceptance from the target server at a peer level.

4. The method of claim 1, further comprising recording the parent workload group as inactive at the active server.

5. The method of claim 1, further comprising transferring application-specific objects corresponding to the child workload groups at a peer level.

6. The method of claim 1, further comprising redirecting entities operating on elements of the parent workload group to the target server managing the child workload group.

7. The method of claim 6, further comprising:
   receiving a probe message from an entity operating on an entity workload unit, the entity workload unit being a member of the parent workload group, the probe message including a selected key identifier formed by selecting a depth to be associated with the entity workload unit's key identifier; and
   sending a response to the entity indicating the group key identifier that a current server locally determines to be the nearest known active parent group to which the element's key identifier belongs.

8. The method of claim 7, wherein the entity operating on a workload unit uses the response to further refine its estimate of a correct depth to be associated with the unit's key identifier; and
   probing another server associated with the parent key group formed by using the refined depth of the unit's key identifier.

9. The method of claim 1, further comprising:
   determining that an under-load condition exists at the active server; and
   if the under-load condition exists:
   identifying at least two workload groups for consolidation into a consolidated workload group;
   generating a consolidated key identifier such that workload units belonging to the consolidated workload group share an identical sequence of values at a specified depth value of the consolidated key identifier; and
   managing the consolidated workload group by the active server.

10. The method of claim 9, wherein generating the consolidated key identifier includes decreasing the depth value of the parent workload group such that the consolidated workload group is identified.

11. The method of claim 1, further comprising associating the workload unit with the key identifier such that the key identifier encodes one or more attributes of the workload unit.

12. The method of claim 1, further comprising constructing a virtual key for mapping to the target server, wherein the virtual key includes a number of masked of digits, the number of masked digits dependent on the overload condition.

13. The method of claim 12, further comprising using the constructed load-dependent virtual key as an input to a separate mapping service that returns the identity of the target server to which the workload elements belonging to the virtual key should be directed.

14. A system for running a distributed computer application whose workload can be decomposed into a set of workload units, each workload unit including its own key identifier, over a dynamically varying set of distributed resources, the number of distributed resources involved in the distributed computer application varying dynamically in response to changes in an overall workload, the system comprising:
   a set of active resources cooperatively managing an entire set of identifier keys constituting the overall workload, each individual active resource managing a dynamically varying group of identifier keys, each active resource independently evaluating its own workload condition and deciding on the creation or consolidation of identifier keys to reduce or increase its workload;

an overall set of resources, of which the active resources constitute a subset that can be utilized as part of the distributed computer application as needed;

a mapping service configured to receive a virtual key associated with at least one of the dynamically varying group of identifier keys as input and configured to produce an identity of a target resource from the overall resource set as an output; and a set of client entities utilizing the distributed computer application, each client entity being associated with at least one identifier key, and each client entity dynamically determining the dynamically varying group of key identifiers that it currently belongs to.

15. A computer system for dynamically adjusting a workload of an active resource, the system comprising:

a plurality of workload units, each workload unit being associated with a key identifier identifying the workload unit;

a parent workload group including the plurality of workload units, wherein the workload units belonging to the parent workload group share an identical sequence of values at a specified depth value of the identifier key, the identical sequence of values defining a group key identifier associated with the parent workload group; and an active resource managing the parent workload group, the active resource configured to independently determine that an overload condition exists at the active server and increase the depth value of the identifier key associated with the parent workload group such that at least two child workload groups are identified and assign a target server to manage at least one of the child workload groups if an overload condition exists at the active resource;

a mapping service configured to receive a virtual key associated with at least one of a dynamically varying group of identifier keys as input and configured to produce an identity of a target resource from an overall resource set as an output; and a set of client entities utilizing the distributed computer application, each client entity being associated with at least one identifier key, and each client entity dynamically determining the dynamically varying group of key identifiers that it currently belongs to.

16. The system of claim 15, wherein the active resource is further configured to identify at least one candidate resource to which the child workload groups may be distributed using a decentralized protocol, the at least one candidate resource including the target server.

17. The system of claim 15, wherein the active resource is further configured to request workload acceptance from the target resource at a peer level.

18. The system of claim 15, wherein the active resource is further configured to record the parent workload group as inactive at the active resource.

19. The system of claim 15, wherein the active resource is further configured to transfer application-specific objects corresponding to the child workload groups at a peer level.

20. The system of claim 15, wherein the active resource is further configured to identify at least two workload groups for consolidation into a consolidated workload group, generate a consolidated key identifier such that workload units belonging to the consolidated workload group share an identical sequence of values at a specified depth value of the consolidated key identifier, and manage the consolidated workload group by the active resource if an under-load condition exists.

21. The system of claim 20, wherein the active resource is further configured to decrease the depth value of the parent workload group key identifier such that the consolidated workload group is identified.

22. The system of claim 15, wherein the active resource is further configured to associate the workload unit with the key identifier such that the key identifier encodes one or more attributes of the workload unit.

23. The system of claim 15, wherein the active resource is further configured to construct a virtual key for mapping to the target resource, wherein the virtual key includes a number of masked of digits, the number of masked digits dependent on the overload condition.

24. The system of claim 15, further comprising an external service configured to identify at least one candidate resource to which the child workload groups may be distributed.

25. A computer program product embodied in a tangible media comprising:

computer readable program codes coupled to the tangible media for dynamically adjusting a workload of an active resource, the computer readable program codes configured to cause the program to:

divide the workload into a collection of workload units, each unit including its own key identifier identifying the workload unit;

associate the active resource with at least one parent workload group, the parent workload group including the collection of workload units such that the collection of workload units belonging to the parent workload group share an identical sequence of values at a specified depth value of their key identifiers, the identical sequence of values defining a group key identifier associated with the parent workload group;

determine that an overload condition exists at the active resource; and if the overload condition exists:

increase the depth value of the key identifier associated with the parent workload group such that at least two child workload groups are identified; and assign a target resource to manage at least one of the child workload groups;

receive a virtual key associated with at least one of a dynamically varying group of identifier keys as input to produce an identity of a target resource from an overall resource set as an output; and associate each one of a set of client entities with at least one identifier key, wherein each client entity dynamically determining the dynamically varying group of key identifiers that it currently belongs to.

26. The computer program product of claim 25, further comprising program code configured to identify at least one candidate resource to which the child workload groups may be distributed if the overload condition exists using a decentralized protocol, the at least one candidate resource including the target server.

27. The computer program product of claim 25, further comprising program code configured to request workload acceptance from the target resource at a peer level.

28. The computer program product of claim 25, further comprising program code configured to record the parent workload group as inactive at the active resource.

29. The computer program product of claim 25, further comprising program code configured to transfer application-specific objects corresponding to the child workload groups at a peer level.

30. The computer program product of claim 25, further comprising program code configured to redirect entities operating on elements of the parent workload group to the target resource managing the child workload group.

31. The computer program product of claim 30, further comprising program code configured to:
receive a probe message from an entity operating on elements of the parent workload group, the probe message including a selected key identifier at a selected depth; and
send a response to the entity indicating the target resource managing the child workload group.

32. The computer program product of claim 25, further comprising program code configured to:
determine that an under-load condition exists at the active resource; and
if the under-load condition exists:
identify at least two workload groups for consolidation into a consolidated workload group;
generate a consolidated key identifier such that workload units belonging to the consolidated workload group share an identical sequence of values at a specified depth value of the consolidated key identifier; and
manage the consolidated workload group by the active resource.

33. The computer program product of claim 31, wherein the program code to generate the consolidated key includes program code to decrease the depth value of the parent workload group such that the consolidated workload group is identified.

34. The computer program product of claim 25, further comprising program code configured to associate the workload unit with the key identifier such that the key identifier encodes one or more attributes of the workload unit.

35. The computer program product of claim 25, further comprising program code configured to construct a virtual key for mapping to the target resource, wherein the virtual key includes a hash value of the key identifier.

* * * * *